United States Patent
Kanazawa et al.

(10) Patent No.: US 10,425,025 B2
(45) Date of Patent: Sep. 24, 2019

(54) POWER CONVERSION DEVICE AND MOTOR DRIVE APPARATUS

(71) Applicant: Hitachi Automotive Systems, Ltd., Hitachinaka-shi, Ibaraki (JP)

(72) Inventors: Takuro Kanazawa, Tokyo (JP); Kimihisa Furukawa, Tokyo (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 15/580,946

(22) PCT Filed: Jun. 27, 2016

(86) PCT No.: PCT/JP2016/068979
§ 371 (c)(1),
(2) Date: Dec. 8, 2017

(87) PCT Pub. No.: WO2017/002750
PCT Pub. Date: Jan. 5, 2017

(65) Prior Publication Data
US 2018/0183369 A1 Jun. 28, 2018

(30) Foreign Application Priority Data
Jul. 1, 2015 (JP) .................................. 2015-132312

(51) Int. Cl.
*H02P 6/14* (2016.01)
*H02P 6/28* (2016.01)
(Continued)

(52) U.S. Cl.
CPC ............... *H02P 6/28* (2016.02); *B62D 5/046* (2013.01); *G01D 5/244* (2013.01); *H02P 6/16* (2013.01);
(Continued)

(58) Field of Classification Search
CPC ..... B62D 5/046; G01D 5/244; H02M 7/53871; H02P 6/16; H02P 6/28
See application file for complete search history.

(56) References Cited

U.S. PATENT DOCUMENTS

2004/0262074 A1* 12/2004 Nagase .................. B62D 5/046
180/446
2010/0327786 A1* 12/2010 Aoki ................... G01D 5/24452
318/400.04
(Continued)

FOREIGN PATENT DOCUMENTS

JP 2012-39737 A 2/2012
JP 2013-11538 A 1/2013
(Continued)

OTHER PUBLICATIONS

International Search Report (PCT/ISA/210) issued in PCT Application No. PCT/JP2016/068979 dated Sep. 20, 2016 with English translation (three pages).
(Continued)

*Primary Examiner* — Muhammad S Islam
(74) *Attorney, Agent, or Firm* — Crowell & Moring LLP

(57) ABSTRACT

Magnetic flux generated when a current flows through a main circuit wiring serves as disturbance of a magnetic sensor, and accurate rotor position information is obtained. A motor drive apparatus controls an operation of a power conversion device outputting a current to an AC motor on the basis of a desired torque command value, and includes a main circuit wiring that is electrically connected to a switching element forming the power conversion device, and through which a DC current or an AC current is transmitted thereto, a magnetic sensor that detects a magnetic flux change of a sensor magnet attached to a rotor of the AC motor, and a controller that calculates a current command value which is output from the power conversion
(Continued)

device to the motor on the basis of position information of the rotor detected by the magnetic sensor, in which the controller includes a magnetic flux error correction unit that detects or calculates a magnetic flux component generated by a current flowing through the main circuit wiring.

12 Claims, 9 Drawing Sheets

(51) Int. Cl.
*G01D 5/244* (2006.01)
*B62D 5/04* (2006.01)
*H02P 6/16* (2016.01)
*H02M 7/5387* (2007.01)

(52) U.S. Cl.
CPC ....... *B62D 5/0409* (2013.01); *H02M 7/53871* (2013.01)

(56) References Cited

U.S. PATENT DOCUMENTS

2012/0031697 A1 2/2012 Matsuda
2014/0125267 A1 5/2014 Suzuki

FOREIGN PATENT DOCUMENTS

JP 2014-54079 A 3/2014
KR 10-2014-0059932 A 5/2014

OTHER PUBLICATIONS

Japanese-language Written Opinion (PCT/ISA/237) issued in PCT Application No. PCT/JP2016/068979 dated Sep. 20, 2016 (four pages).
Korean-language Office Action issued in counterpart Korean Application No. 10-2017-7036675 dated May 29, 2019 with English translation (eight (8) pages).

\* cited by examiner

[Fig. 1]
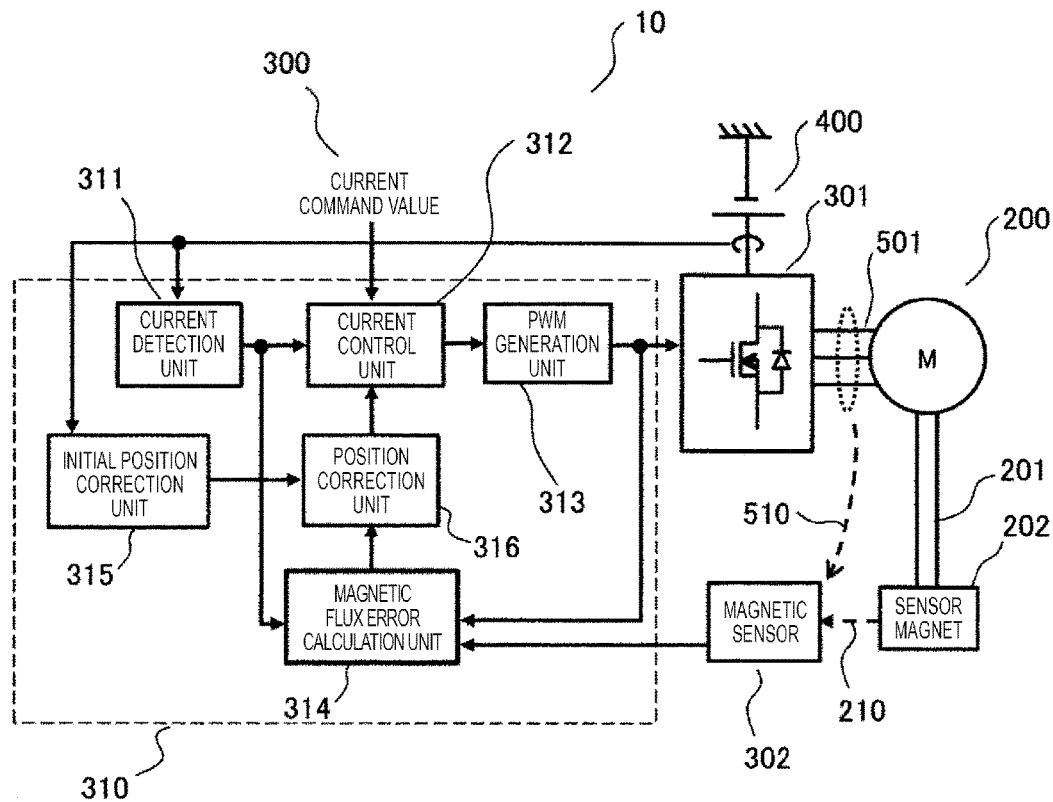
[Fig. 2]
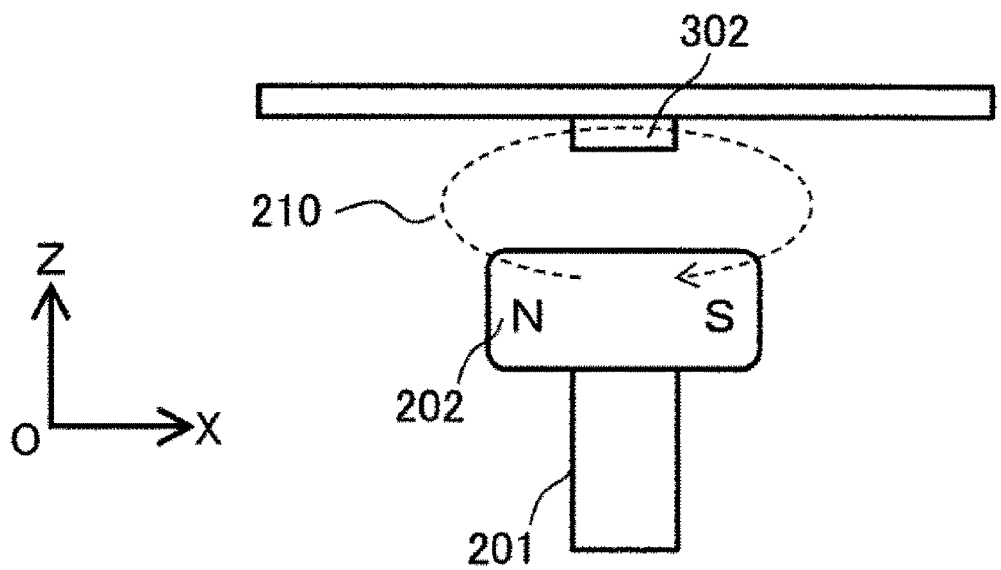

[Fig. 3]
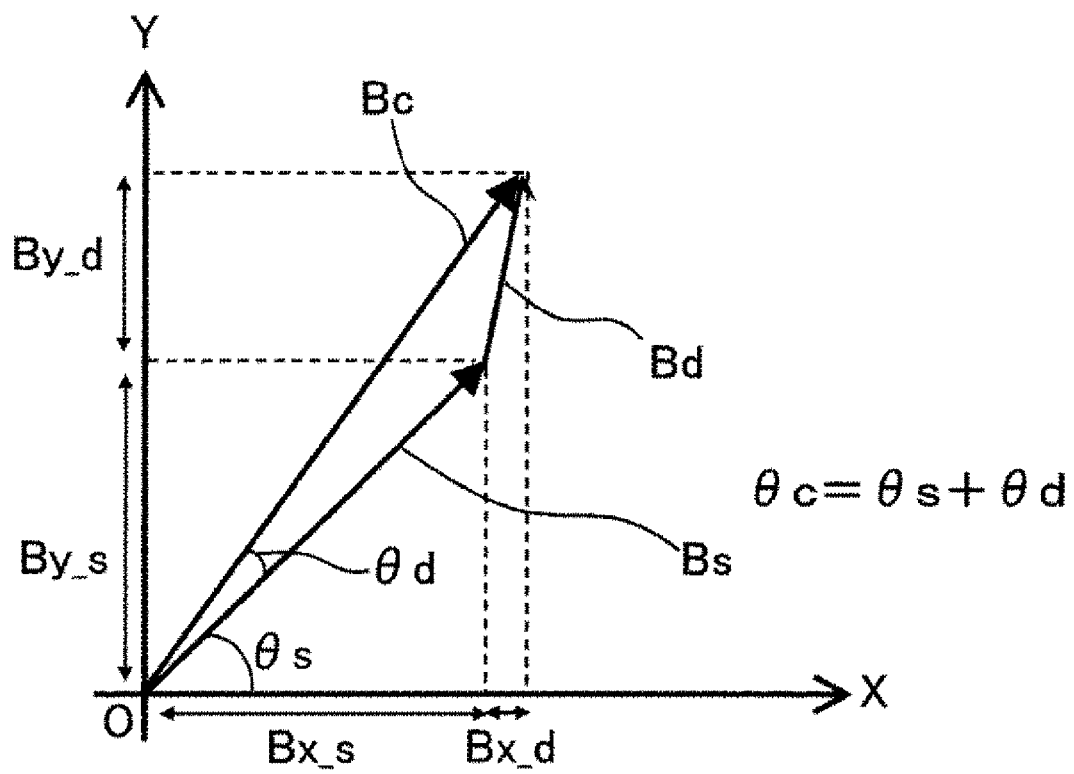

[Fig. 4]
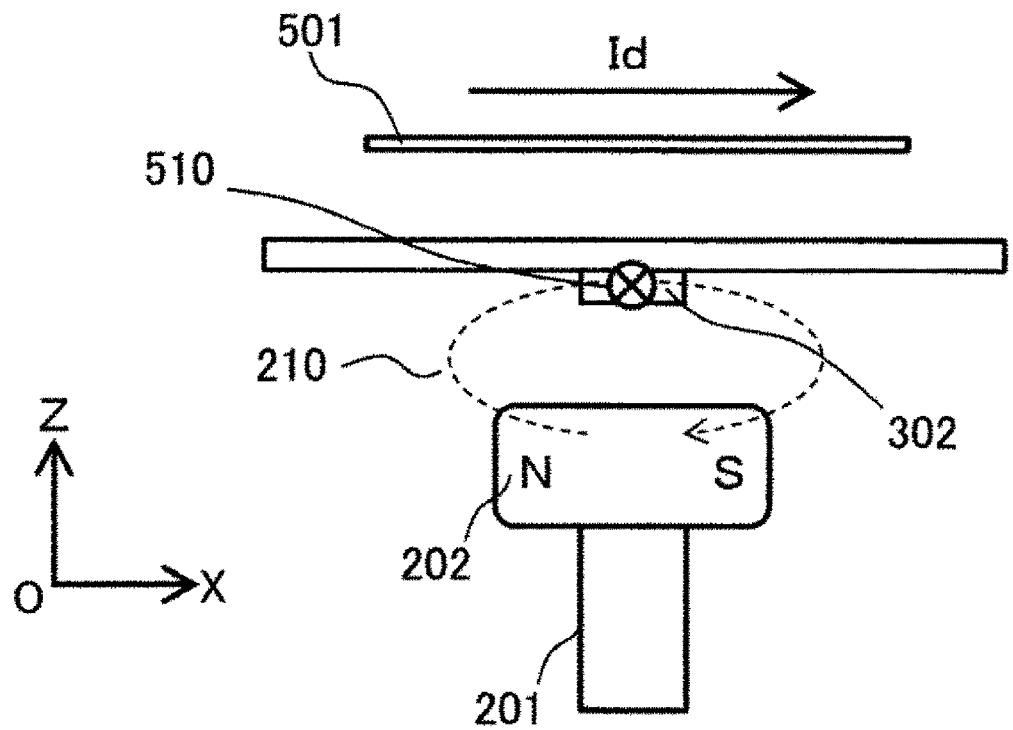
[Fig. 5]
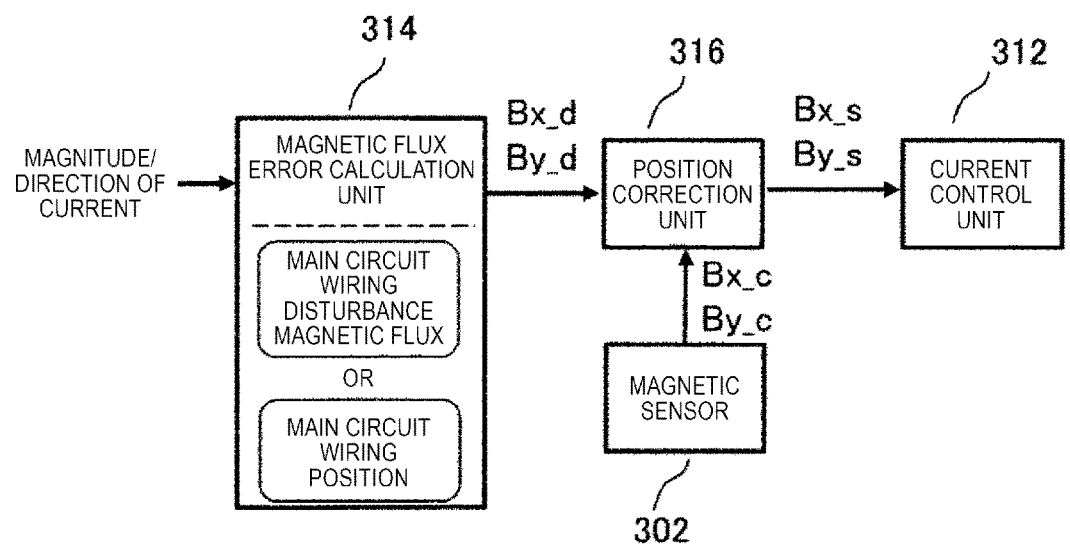

[Fig. 6]
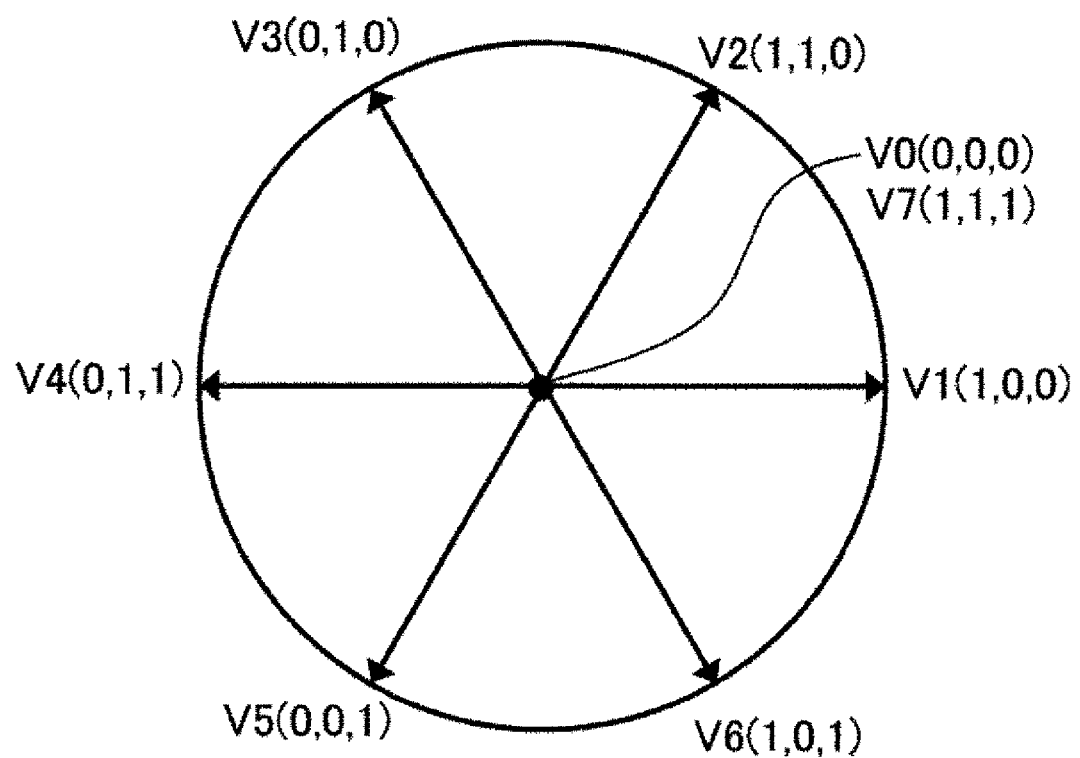

[Fig. 7]
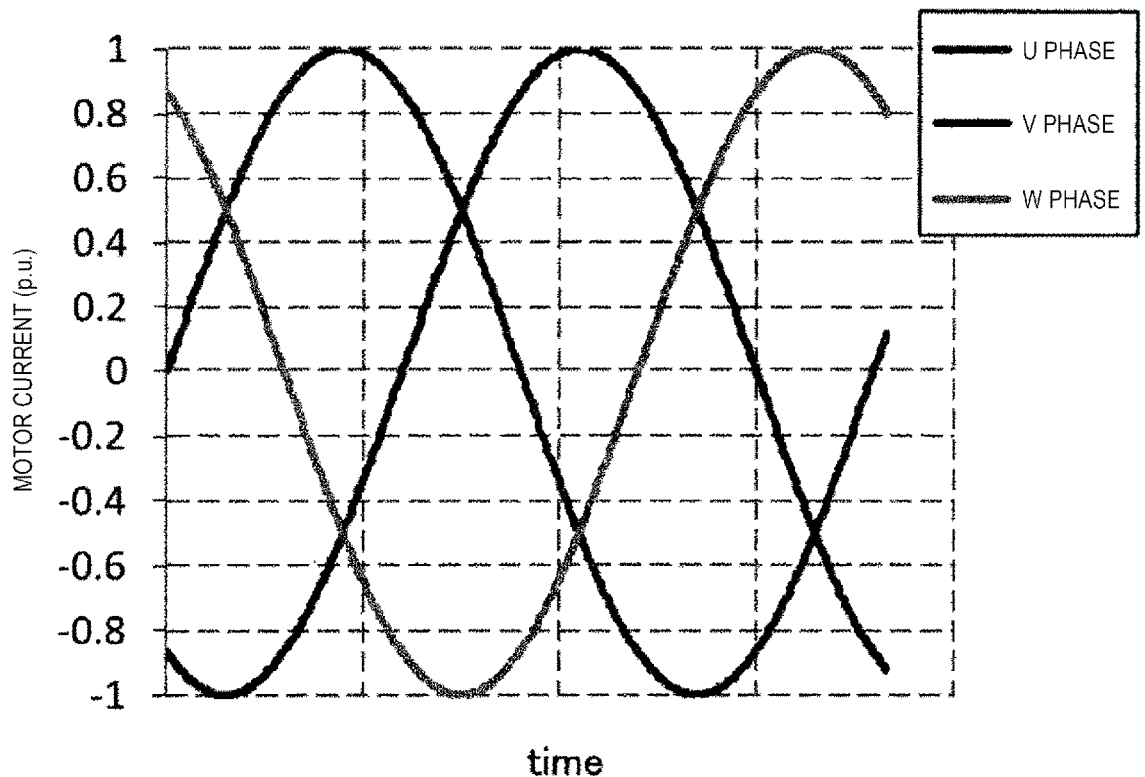
[Fig. 8]
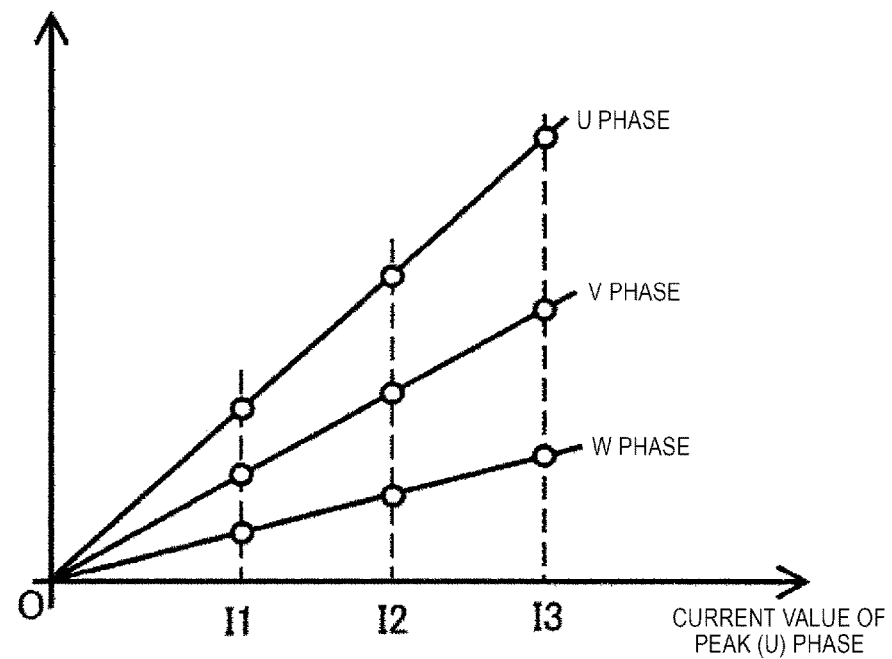

[Fig. 9]
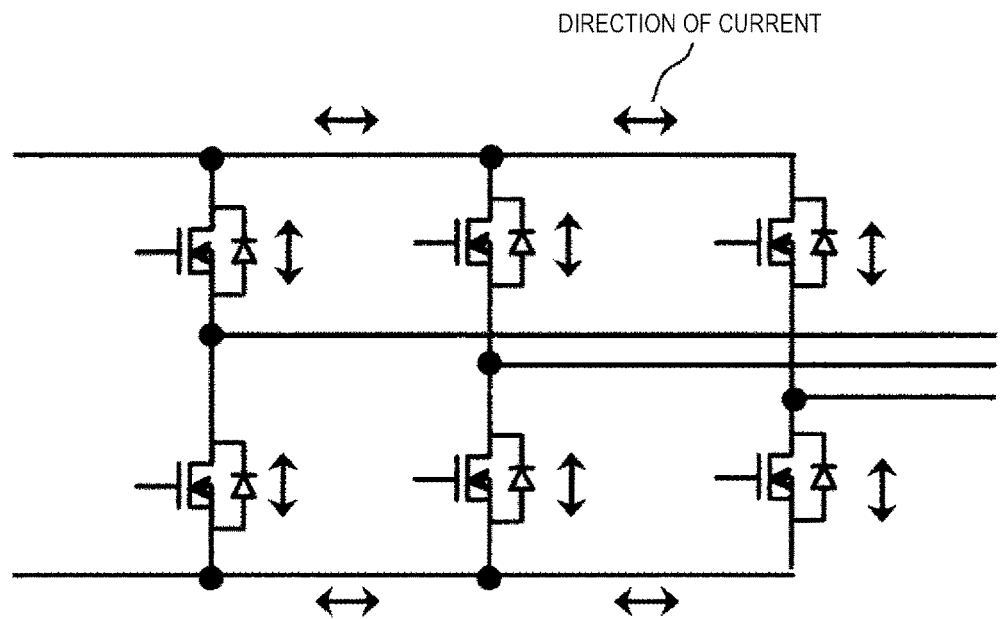
[Fig. 10]
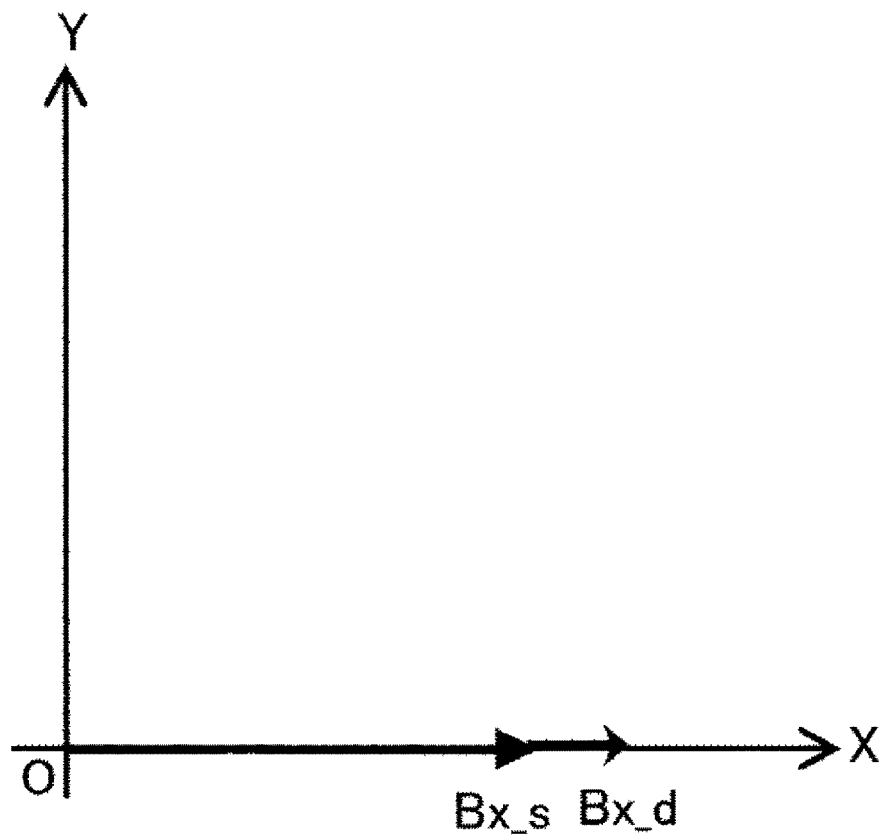

[Fig. 11]
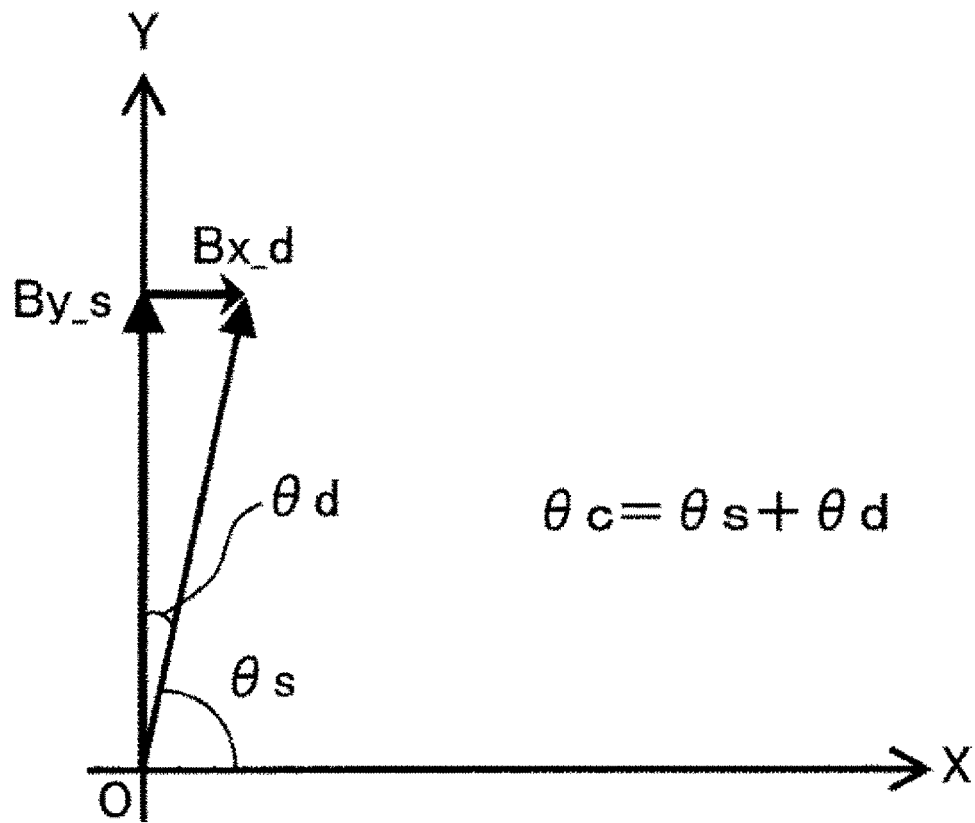
[Fig. 12]
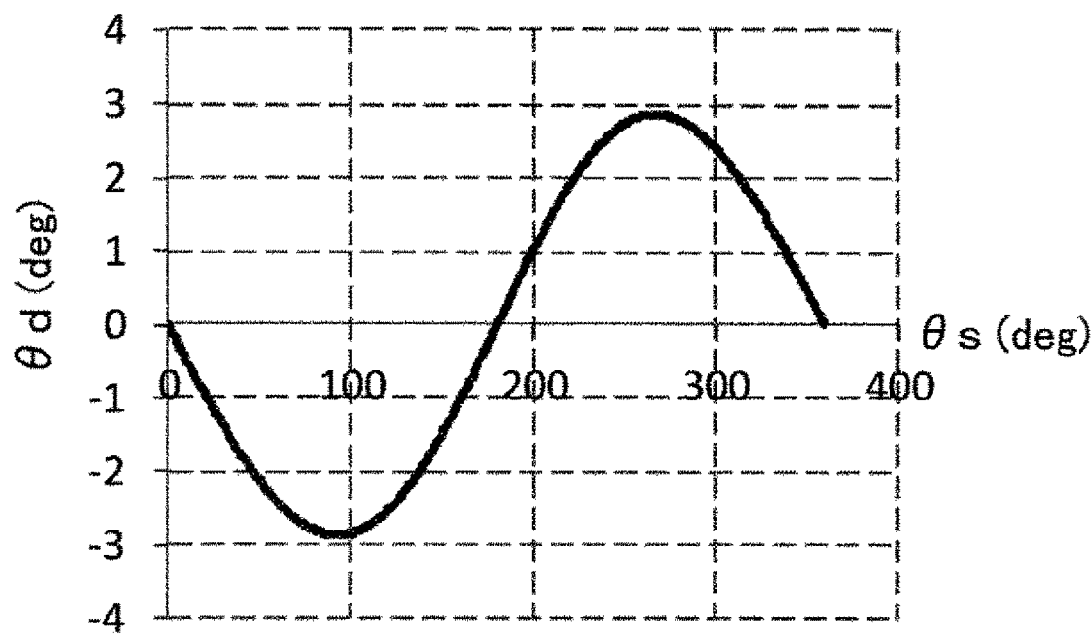

[Fig. 13]
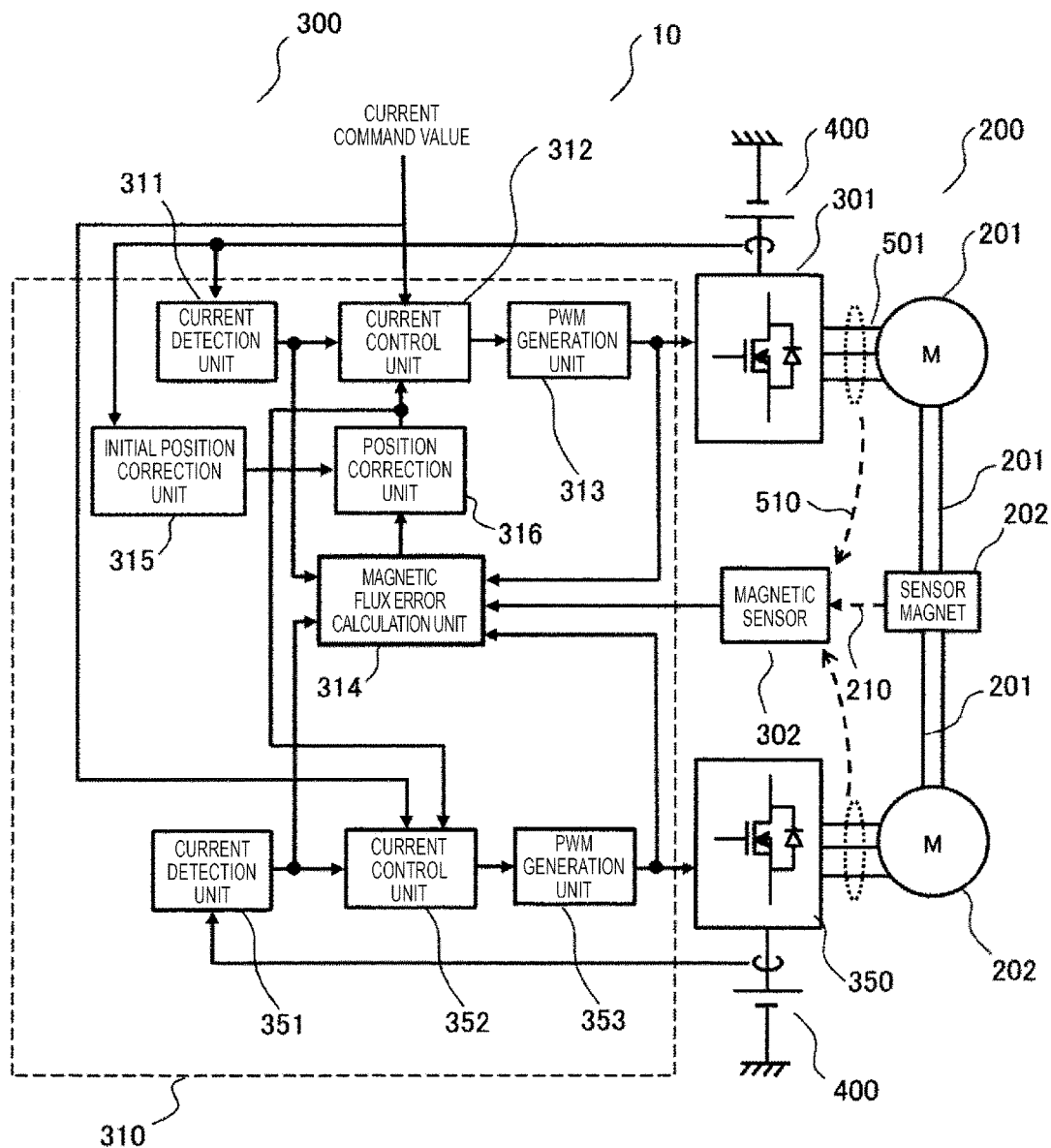

[Fig. 14]
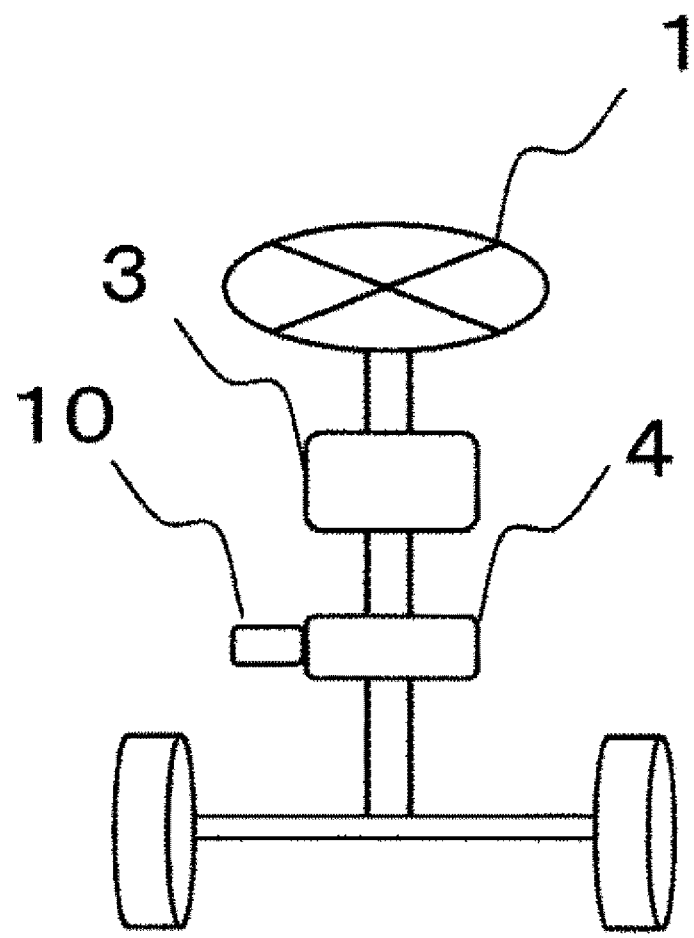

POWER CONVERSION DEVICE AND MOTOR DRIVE APPARATUS

TECHNICAL FIELD

The present invention relates to a motor drive apparatus, and particularly to a power conversion device which detects a position of a motor rotor by using a sensor magnet attached to the motor rotor and a magnetic sensor provided near the sensor magnet, and to a rotor position detection method in a mounting structure in which a main circuit wiring of the power conversion device or the motor is disposed near the magnetic sensor.

BACKGROUND ART

In recent years, in a motor drive apparatus for an automobile or an industry, in order to remove or miniaturize a harness connecting a motor to a power conversion device, mechatronical integration has progressed in which the motor and the power conversion device are built into a common casing, or a casing is directly connected thereto. In this mechatronical integration mounting structure, a noncontact sensor or the like starts to be used in order to reduce the number of contacts of electrical wirings between the motor and the power conversion device. A magnetic sensor such as a hole element or an MR element is frequently used instead of a resolver of the related art as a noncontact position sensor for detecting a rotor position of a motor.

For example, PTL 1 discloses a system using a magnetic sensor. PTL 1 discloses a rotation angle measurement device which includes a magnetic sensor responding in a magnetic field direction, and a detection unit receiving output from the magnetic sensor; the rotation angle measurement device is used along with a rotor having a magnetic flux generation member; the output from the magnetic sensor is an original angle signal set corresponding to the magnetic field direction; and the detection unit outputs a correction angle in which the influence of a nonmagnetic conductor disposed near the magnetic sensor is corrected by using a correction value which is output by a correction function having a rotation speed of the rotor as an argument.

In recent years, as a result of high density mounting of a power conversion device for realizing mechatronical integration, a main circuit wiring via which a power source is electrically connected to the motor and which causes a current for driving the motor to flow is disposed near the above-described magnetic sensor.

PTL 2 discloses an example of a motor drive apparatus with high density. PTL 2 discloses a motor including a stator on which a plurality of winding wires are wound; a rotor rotatably disposed within an inner radius of the stator; a shaft coaxially disposed to be rotatable with the rotor; a magnet disposed on one end of the shaft to be rotatable with the rotor and the shaft; a magnetic sensor disposed to face the magnet in an axial direction of the shaft for detecting a rotation angle of the rotor by sensing the magnetism generated by the magnet; a control device controlling power supplied to each of the winding wires on the basis of the rotation angle of the rotor detected by the magnetic sensor; and a first conducting wire and a second conducting wire respectively intersecting a virtual circle centering on an axis of the shaft and respectively extending in parallel with the axis of the shaft, for connecting the control device to each of the plurality of winding wires, in which a current flowing through each of the first conducting wire and the second conducting wire has the same magnitude and the same flow direction as each other at any point of time, and a position of the first conducting wire and a position of the second conducting wire satisfy a relationship α=180, when an intersection of the first conducting wire with the virtual circle is designated as a point p1, and an intersection of the second conducting wire with the virtual circle is designated as a point p2, and a central angle of an arc p1p2 of the virtual circle is designated as α(°).

Here, the content disclosed in PTL 1 relates to a method of reducing the influence of an eddy current generated in a metal disposed near the magnet exerted on the magnetic sensor by rotating the position detection magnet at a high speed. However, for example, a main circuit wiring made of copper is disposed as a nonmagnetic body disposed near the position sensor, and it is not possible to reduce the influence that magnetic flux generated on the basis of the Biot-Savart law when a current flows through the main circuit wiring exerts on the magnetic sensor.

On the other hand, according to the content disclosed in PTL 2, in six motor wires connected to two three-phase inverters, motor coils connected to the six motor wires are disposed in the same casing. The system detecting a position of the rotor with the magnetic sensor has a structure in which two motor wires having the same phase centering on the magnetic sensor are opposite to each other by 180°. In the above-described arrangement, a magnetic flux vector generated when a current flows through one motor wire and a magnetic flux vector generated when a current with the same magnitude and direction flow through the other motor wire cancel out each other at a detection point of the magnetic sensor, and thus the influence of magnetic flux generated when a current flows through the main circuit wiring can be reduced. However, in the aspect disclosed in PTL 2, in a case where one inverter fails, and an operation is continuously performed with only the other inverter, magnetic flux generated from the other motor wire cannot be canceled out at a detection point in the magnetic sensor, and thus there is a problem in which position detection accuracy deteriorates, and thus motor control is unstable.

CITATION LIST

Patent Literature

PTL 1: JP-A-2013-11538
PTL 2: JP-A-2012-039737

SUMMARY OF INVENTION

Technical Problem

In a motor drive apparatus in which position information of a rotor is detected with a sensor magnet attached to a rotor of a motor, and a magnetic sensor disposed in the motor drive apparatus, and a main circuit wiring is disposed near the magnetic sensor in order to realize high density mounting, magnetic flux generated when a current flows through the main circuit wiring serves as disturbance, and thus it is hard to obtain accurate rotor position information.

Solution to Problem

According to the present invention, there is provided a motor drive apparatus controlling an operation of a power conversion device outputting a current to a motor on the basis of a desired torque command value, the apparatus including a main circuit wiring that is electrically connected to a switching element forming the power conversion device, and through which a DC current or an AC current is transmitted thereto; a magnetic sensor that detects a magnetic flux change of a sensor magnet attached to a rotor of the motor; and a controller that calculates a current command value which is output from the power conversion device to the motor on the basis of position information of the rotor detected by the magnetic sensor, in which the controller includes a magnetic flux error correction unit that detects or calculates a magnetic flux component generated by a current flowing through the main circuit wiring.

Advantageous Effects of Invention

According to the present invention, it is possible to reduce the influence that disturbance magnetic flux generated when a current flows through a main circuit wiring disposed near a magnetic sensor exerts on position detection in the magnetic sensor, and thus high density mounting of a motor drive apparatus is realized. A rotor position of the motor can be detected with high accuracy, and thus favorable motor control is realized. Since the present invention is applied to a system in which a single motor is driven with two three-phase bridge circuits, even in a case where one three-phase bridge circuit fails, the other three-phase bridge circuit is continuously operated, and thus the motor can be favorably continuously driven.

BRIEF DESCRIPTION OF DRAWINGS

FIG. 1 is a circuit diagram of a motor drive apparatus in Example 1.

FIG. 2 illustrates an example of a structure diagram of a magnetic sensor periphery in a structure of the related art.

FIG. 3 is a diagram illustrating a magnetic flux vector of a magnetic sensor portion in Example 1.

FIG. 4 illustrates an example of a structure diagram of a magnetic sensor periphery in Example 1.

FIG. 5 is a configuration diagram of a controller in Example 2.

FIG. 6 is a diagram for explaining a voltage vector in Example 4.

FIG. 7 illustrates an example of a motor current in Example 4.

FIG. 8 illustrates examples of a current and disturbance magnetic flux in Example 4.

FIG. 9 illustrates three-phase bridge circuits and directions of a current in Example 4.

FIG. 10 illustrates a sensor magnet magnetic flux vector and a disturbance magnetic flux vector in Example 5.

FIG. 11 illustrates a sensor magnet magnetic flux vector and a disturbance magnetic flux vector in Example 5.

FIG. 12 illustrates an accurate sensor magnet position, and a result of subtracting the influence of disturbance magnetic flux from position information which is output from a magnetic sensor with respect to 360 degrees.

FIG. 13 is a circuit diagram of a motor drive apparatus in Example 6.

FIG. 14 is a system diagram of an electric power steering device in Example 7.

DESCRIPTION OF EMBODIMENTS

Hereinafter, with reference to the drawings, a description will be made of embodiments of a power conversion device according to the present invention. The same constituent elements are given the same reference numerals through the drawings, and repeated description will be omitted.

Example 1

With reference to FIG. 1, a description will be made of a power conversion device and a motor drive apparatus according to Example 1. FIG. 1 is a circuit diagram illustrating the entire configuration of a motor drive apparatus 10 according to Example 1.

A power conversion device 300 which converts power from a DC power source 400 from DC power into AC power is connected to a motor 200 which converts electrical energy to mechanical energy so as to be driven. Herein, the drive apparatus 10 is formed of the power conversion device 300 and the motor 200. The motor 200 is formed of, for example, a three-phase motor, and a sensor magnet 202 for detecting a position of a rotor 201 is attached to a distal end of the rotor 201.

The power conversion device 300 includes six semiconductor elements forming a three-phase bridge circuit 301 for converting DC power into three-phase AC power. The semiconductor element is a power semiconductor element such as a metal-oxide semiconductor field-effect transistor (MOSFET) or an insulated gate bipolar transistor (IGBT).

Although not illustrated, one or more smoothing capacitors for smoothing a power source voltage are provided between positive and negative wires located further toward the DC power source 400 side than the three-phase bridge circuit 301. For example, an electrolytic capacitor having a sufficient capacitance or a conductive polymer hybrid electrolytic capacitor is used as the smoothing capacitor. A current detector for detecting a phase current of the motor is provided at a positive or negative wire between the three-phase bridge circuit 301 and the smoothing capacitor. As the current detector, a low resistance resistor with a small loss is used, but other current detectors such as a current transformer may be used. A filter component such as a normal mode choke coil or a capacitor is disposed as a noise countermeasure further toward the DC power source 400 side than the smoothing capacitor.

Next, a controller of the power conversion device will be described. The power conversion device 300 includes a controller 310. The controller 310 includes a current control unit 312, and receives a current command value for controlling an operation of the motor 200 at a desired value from the motor drive apparatus 10. The controller 310 includes a current detection unit 311 which filters and amplifies a voltage value obtained from the current detector provided in the power conversion device 300, and the current detection unit 311 outputs current information of the motor 200 to the current control unit 312. A magnetic sensor 302 mounted in the motor drive apparatus 10 detects a magnetic flux change of the sensor magnet 202 attached to the rotor 201, and outputs rotor position information to the current control unit 312. The magnetic sensor 302 may be a hole IC, a giant magneto resistive effect (GMR) sensor, a tunnel magneto resistance effect (TMR) sensor, or the like. The magnetic sensor 302 may be mounted on a printed board on which the current detection unit 311 or a PWM generation unit 313 is mounted, that is, components such as an operational amplifier, a microcomputer, a driver IC, or a power source IC are mounted, and may be mounted on a dedicated board for the magnetic sensor 302 so as to be attached to the power conversion device 300 or the motor 200.

The current control unit 312 generates a voltage command value V* supplied to the three-phase bridge circuit 301 on the basis of the above-described current detection value, rotor position detection value and current command value, and outputs the voltage command value V* to the PWM generation unit 313. The PWM generation unit 313 outputs a gate voltage command to each semiconductor element of the three-phase bridge circuit 301 on the basis of the voltage command value V*. As a result, the power conversion device 300 supplies three-phase AC currents to the motor 200, and the motor works by converting electrical energy into mechanical energy.

Since there is concern about the occurrence of deviation in a magnetization amount of the sensor magnet 202, or the occurrence of positional deviation of the sensor magnet 202 or the magnetic sensor 302 during attachment, the controller 310 includes an initial position correction unit 315 which corrects initial deviation relative to a designed value. An error amount obtained in the initial position correction unit 315 is supplied to a position correction unit 316, and thus accurate position information of the rotor 201 can be obtained even if there is an individual difference in the motor drive apparatus 10.

Next, a description will be made of a method of detecting position information of the rotor 201 by using the sensor magnet 202 with reference to FIGS. 2 and 3. As illustrated in FIG. 2, the sensor magnet 202 for detecting a position of the rotor 201 is attached to the distal end of the rotor 201 of the motor 200. Here, it is assumed that the sensor magnet 202 is magnetized to two poles. On the other hand, the magnetic sensor 302 mounted on the board is disposed to be separated by a predetermined distance at a position facing the sensor magnet 202.

A magnet magnetic flux vector 210 corresponding to a magnetization amount comes out of the sensor magnet 202 magnetized to two poles in a direction from the N pole to the S pole, and the magnet magnetic flux vector 210 penetrates through the magnetic sensor 302. Here, the magnet magnetic flux vector is indicated by Bs, and magnetic flux vectors decomposed in in-surface (X,Y) directions at a detection position in the magnetic sensor 302 are respectively indicated by Bx_s and By_s.

The magnet magnetic flux vector Bs changes from 0 degrees to 360 degrees along with rotation of the rotor 201 in an XY plane of a detection position in the magnetic sensor 302. FIG. 3 illustrates only a first quadrant extracted in relation to a vector diagram of the magnet magnetic flux vector Bs. If the magnetic flux Bx_s in the X direction and the magnetic flux By_s in the Y direction can be detected with respect to the changing magnet magnetic flux vector Bs, an angle θs of the rotor 201 can be detected according to Equation (1).

$$\theta s = \mathrm{Tan}^{-1}\left(\frac{By\_s}{Bx\_s}\right) \quad (1)$$

An angle θs of the rotor 201 can be detected.

A hole element or an MR element can output respective voltage values corresponding to the magnetic fluxes Bx_s and By_s generated from the sensor magnet 202, and thus the angle θs of the rotor 201 is calculated on the basis of the output voltage values in the controller 300.

Next, FIG. 4 illustrates an internal structure of the motor drive apparatus 10 in a case where high density mounting accompanying mechatronical integration is performed. A distance between the magnetic sensor 302 and a main circuit wiring 501 is short in order to realize high density mounting.

Here, the main circuit wiring indicates all wires through which energy for driving the motor 200, flowing between the DC power source 400 and the motor 200, passes. Specifically, the main circuit wiring may be, for example, an electrical wire such as a bus bar provided in the power conversion device 300, three-dimensional wires mounted on a board, and three-phase wires connected to the motor 200.

If a current flows through the main circuit wiring 501, a magnetic flux vector Bd based on the Biot-Savart law is generated according to Equation (2).

$$dB = \frac{\mu_0 I}{4\pi} \frac{dl \times r}{r^3} \quad (2)$$

In the figure, as a result of a main circuit current Id flows in a rightward direction, a direction of the magnetic flux vector Bd generated from the main circuit wiring 501 is a direction from the front side to the depth side of the drawing surface, that is, the Y direction. Here, magnetic fluxes obtained by decomposing a magnetic flux vector generated from the main circuit wiring 501 in the in-surface (XY) directions at the detection position in the magnetic sensor are respectively indicated by Bx_d and By_d.

Next, the vector diagram of FIG. 3 is referred to again. In a case where the main circuit wiring 501 is disposed near the magnetic sensor 302, a position of the rotor 201 detected by the magnetic sensor 302, that is, a magnetic flux vector is a value obtained by adding the magnet magnetic flux vector Bs generated by the sensor magnet 202 to the disturbance magnetic flux vector Bd generated due to a current flowing through the main circuit wiring 501. As a result, if a rotor position calculated on the basis of a value output from the magnetic sensor 302 is indicated by θc, the power conversion device 300 obtains position information based on Equation (3).

$$\theta c = \mathrm{Tan}^{-1}\left(\frac{By\_s + By\_d}{Bx\_s + Bx\_d}\right) \quad (3)$$

Here, a sum of the magnet magnetic flux vector and the disturbance magnetic flux vector is indicated by Bc.

As mentioned above, in the motor drive apparatus 10 in which the main circuit wiring 501 is disposed near the magnetic sensor 302, the magnetic sensor 302 cannot obtain accurate position information of the rotor 201 due to the influence of the disturbance magnetic flux vector Bd, and, as a result, it is hard to stably control the motor 200.

Therefore, the controller 310 in the present example includes a magnetic flux error calculation unit 314 which calculates the disturbance magnetic flux vector Bd generated from the main circuit wiring 501, and a position correction unit 316 which corrects the influence of the disturbance magnetic flux vector Bd on the basis of the position information θc or Bc output from the magnetic sensor 302.

The magnitude of a current of the main circuit wiring 501 obtained from the current detection unit 311, a direction of the current obtained from the PWM generation unit 313, and position information of the rotor 201 output from the magnetic sensor 302 are supplied to the magnetic flux error calculation unit 314. The magnetic flux error calculation unit 314 calculates the disturbance magnetic flux vector Bd generated from the main circuit wiring 501 or a positional error θd on the basis of all or some of the magnitude of the current, the direction of the current, and information regarding a sensor magnet position. The position correction unit 316 outputs accurate position information of the rotor 201 to the current control unit 312 by removing the influence of disturbance magnetic flux from an output from the magnetic sensor 302.

With this configuration, the following effects can be achieved.

(1) Since the controller corrects the influence that a disturbance magnetic flux vector generated from the main circuit wiring exerts on the magnetic sensor, the power conversion device can obtain position information without any error, and, as a result, it is possible to implement the motor drive apparatus performing stable motor control with high performance.

(2) It is not necessary to provide an additional component such as a shield plate formed of, for example, a magnetic body, for preventing disturbance magnetic flux generated from the main circuit wiring from penetrating through the magnetic sensor.

(3) The main circuit wiring can be mounted near the magnetic sensor, and thus it is possible to realize high density mounting of the motor drive apparatus and further miniaturization.

In the present example, the magnetic sensor is provided at the position facing the sensor magnet, but may be disposed with a predetermined distance, for example, in a side surface direction of the sensor magnet as long as a position of the rotor can be detected with the sensor magnet and the magnetic sensor.

In the present example, the influence of a disturbance magnetic flux vector generated from the main circuit wiring is corrected by using the magnetic flux error calculation unit and the position correction unit provided in the power conversion device in advance. Thus, for example, if a foreign substance such as a magnetic body is interposed between the main circuit wiring and the magnetic sensor, the power conversion device performs unnecessary position correction, and thus there is concern that a PWM command value may change or unstable motor control is performed. Therefore, it is necessary to be careful of entering of a foreign substance.

Example 2

In the following Example, a description will be made of, particularly, an operation of magnetic flux error calculation unit in a case where a magnetic sensor outputs a value which is proportional to a magnetic flux vector in relation to Example 1.

FIG. 5 illustrates a flow of a correction method in the present example. During development of the motor drive apparatus 10, layout of the main circuit wiring 501 and other components of the power conversion device 300 is determined. If the layout of the motor drive apparatus 10 is determined, positional relationships among all main circuit wirings and magnetic sensors are uniquely determined. Thus, a disturbance magnetic flux vector generated when a current flows through the main circuit wiring can be calculated by using Equation (2) or a magnetic field analysis tool which is available in the market. The magnetic field analysis tool may be, for example, JMAG produced by JSOL Corporation.

The magnetic flux error calculation unit 314 provides information regarding the disturbance magnetic flux vector Bd generated when a current flows through each main circuit wiring 501 by calculating a relationship between a current and magnetic flux, therein as main circuit wiring disturbance magnetic flux. As a result, in a case where the motor drive apparatus 10 is operated, the magnetic flux error calculation unit 314 can estimate a disturbance magnetic flux vector Bd_i generated from each main circuit wiring 501 on the basis of a direction and the magnitude of a current supplied from the current detection unit 311 and the PWM generation unit 313. Here, i indicates a number of the main circuit wiring. The magnetic flux error calculation unit 314 adds all disturbance magnetic flux vectors Bd_i together, and outputs the disturbance magnetic flux vectors Bx_d and By_d to the position correction unit 316. The position correction unit 316 can calculate a position of the rotor 201 by removing the influence of the disturbance magnetic fluxes Bx_d and By_d from the position information Bx_c and By_c output from the magnetic sensor 302, that is, calculating Bx_s and By_s.

Since the disturbance magnetic flux vector Bd is linear with respect to the magnitude of a flowing current, if the magnetic flux error calculation unit 314 stores therein a value of a disturbance magnetic flux vector for any current value, the disturbance magnetic flux vectors Bd for all current values can be estimated through interpolation or extrapolation.

With the above-described configuration, the power conversion device can correct the influence of a disturbance magnetic flux vector generated from the main circuit wiring on the basis of output from the magnetic sensor, and thus realizes stable motor control with high accuracy. In the present example, for better understanding, the description has been made by using a magnetic flux vector, but, an actual magnetic sensor converts a magnetic flux vector into a voltage value which is then output in most cases, and thus the magnetic flux error calculation unit 314 may store therein a voltage value which is equivalent to main circuit wiring disturbance magnetic flux.

In the correction method described in the present example, for example, a distance r between the main circuit wiring and the magnetic sensor obtained on the basis of shape data may be stored in the magnetic flux error calculation unit so that Equation (2) can be directly solved by also using information regarding a current value obtained during an operation of the motor drive apparatus. In this case, as illustrated in FIG. 5, the magnetic flux error calculation unit 314 stores main circuit wiring position information therein. As a result, it is possible to correct a disturbance magnetic flux vector in real time.

In a case where a current flowing through the main circuit wiring is a high frequency current, and a conductor is disposed near the main circuit wiring 501, the influence of an eddy current generated in the conductor is also predicted. In this case, as shown in Equation (4), disturbance magnetic flux when a DC current flows may be corrected to be proportional to 1/f.

$$\nabla \times J = -j\omega \sigma B \quad (4)$$

A current value which is input to the magnetic flux error calculation unit may use not only a value supplied from the current detection unit but also a current command value calculated by the current command unit.

Example 3

In the following Example, a description will be made of an operation in a case where a threshold value is provided in the magnitude of a disturbance magnetic flux vector in relation to Example 2.

The power conversion device 300 defines a minimum magnetic flux vector Bm as a threshold value in the disturbance magnetic flux vector Bd. The minimum magnetic flux vector Bm is determined on the basis of an allowable detection error for the magnet magnetic flux vector Bs. Thus, the minimum magnetic flux vector Bm is determined in any method in each system on the basis of an allowable value of an electrical angle error of the rotor 201 required by the motor drive apparatus 10, detection accuracy of the magnetic sensor, and position accuracy during mounting, and the like.

Next, the disturbance magnetic flux vector Bd_i generated when the maximum current flows through each main circuit wiring 501 is calculated according to the method described in Example 2, for example. Thus, the maximum disturbance magnetic flux vector Bd_i can be compared with the minimum magnetic flux vector Bm, and, in a case where the maximum disturbance magnetic flux vector has a sufficiently ignorable magnitude for the minimum magnetic flux vector, the main circuit wiring 501 can be deleted from targets of the magnetic flux error calculation unit 314.

If the minimum magnetic flux vector Bm is defined, output from the magnetic sensor 302 may be corrected by using the magnetic flux error calculation unit 314 only in a case where a current flowing through the main circuit wiring 501 is equal to or more than a predetermined value, and thus stable motor control can be realized.

With the above-described configuration, the power conversion device can delete unnecessary main circuit wiring disturbance magnetic flux information, and can also restrict an operation region in which position correction is performed. As a result, it is possible to reduce a calculation load on the controller.

Example 4

The present example relates to an operation of the magnetic flux error calculation unit, and a method which is different from the method in Example 2 will be described. Particularly, Example 2 relates to the method based on stored internal structure information of the power conversion device, whereas the present example relates to a case of not storing the internal structure information of the power conversion device.

FIG. 6 illustrates general voltage vectors in a three-phase inverter. The voltage vectors indicate ON and OFF states of a MOSFET, and there are a total of eight voltage vectors. Directions of currents considered in the respective voltage vectors are a maximum of six cases since a current sum of motor three-phase lines is zero. In other words, even if there is no internal structure information of the power conversion device, the magnetic flux error calculation unit can estimate the influence of a disturbance magnetic flux vector of the main circuit wiring by operating the power conversion device with any voltage vector. Hereinafter, specific methods will be described.

<Case 1: in Case where Disturbance Magnetic Flux of Motor Three-Phase Lines Exerts Influence>

FIG. 7 illustrates current waveforms of three-phase lines of the motor 200. In the power conversion device 300 performing PWM control, if the PWM generation unit 313 outputs a certain voltage command value, a current value at a certain point on a transverse axis in FIG. 7 is output. A current value on a longitudinal axis in FIG. 7 is a normalized value, and a peak current has any magnitude. In this case, a difference delta Bo_d of magnetic sensor output when a current flows with magnetic sensor output at a current of 0 A is expressed by Equation (5) (where o is u, v, and w).

delta $Bu\_d = Iu(Bxu\_d1, Byu\_d1)$ delta $Bv\_d = Iv(Bxv\_d1, Byv\_d1)$ delta $Bw\_d = Iw(Bxw\_d1, Byw\_d1)$ (5)

Here, Bxo_d1 and Byo_d1 are unknown numbers, and indicate the magnitude of disturbance magnetic flux per unit current in each main circuit wiring, and the number of each thereof is three with respect to the X and Y directions. Thus, as illustrated in FIG. 8, the magnitude of a current in a certain voltage vector is changed under at least three conditions so that each output of the magnetic sensor 202 is obtained, and thus the simultaneous equations shown in Equation (5) can be solved. As a result, even if an internal structure is not clear, a disturbance magnetic flux vector generated when currents flow through the three-phase lines of the motor 200 can be estimated.

A method of solving the simultaneous equations may employ not only a method of changing the magnitude of a current in a state in which a voltage vector is fixed, but also a method of changing, for example, a voltage vector, as long as each output of the magnetic sensor 302 can be obtained under any condition. Regarding a method of estimating an actual disturbance magnetic flux vector, the rotor 201 of the motor 200 may be externally forced to be locked, the motor 200 may be driven with only a d-axis command in a state in which a q-axis command is zero, and the motor 200 may be in a rotation state.

<Case 2: in Case where Disturbance Magnetic Flux of DC bus also Exerts Influence>

Since the main circuit wiring has two polarities such as the positive polarity and the negative polarity, a disturbance magnetic flux vector when a current flows through a DC bus is determined by four unknown numbers. A value of a current flowing through the DC bus is the same as a value obtained by filtering a three-phase current of the motor 200 detected by a current detector with a time constant of a predetermined value or more, and a current value of the DC bus can be detected by using the current detection unit described hitherto. Thus, since the same method as in a case of Case 1 can be used, in a case where the influence of the DC bus is also taken into consideration, sequentially can be solved by increasing the magnitude of a current or the number of voltage vectors as much as necessary with respect to Case 1.

<Case 3: in Case where Disturbance Magnetic Flux of Switching Current also Exerts Influence>

FIG. 9 illustrates a three-phase bridge circuit. Directions of currents flowing through MOSFETs and a wiring portion connecting the MOSFETs to each other are determined on the basis of a voltage vector and a direction of a motor current having flowed before. Thus, in a case where the influence of disturbance magnetic flux generated by switching currents illustrated in FIG. 9 is required to be taken into consideration, it is necessary to acquire outputs of the magnetic sensor 302 in more voltage vectors than in Case 2, and to solve simultaneous equations in which equations regarding switching currents are added to Case 2. A value of a current which flows into and flows out of a smoothing capacitor is the same as a value obtained by subtracting a current value of the DC bus from a motor current value, and thus the influence of the smoothing capacitor may be taken into consideration.

A switching current is a high frequency current, and a conductor is frequently disposed near a wire through which the switching current flows in order to realize low inductance. Thus, there is a low probability that a switching current may cause disturbance magnetic flux, and correction can be performed in Cases 1 and 2 in many cases.

As mentioned above, the magnetic flux error calculation unit 314 stores information regarding disturbance magnetic flux created in any one of Cases 1 to 3 therein. Next, the magnetic flux error calculation unit 314 calculates the influence of a disturbance magnetic flux vector by using information regarding the magnitude of a current obtained from the current detection unit 311 and information regarding a direction of the current obtained from the PWM generation unit 313, and outputs a calculation result. The position correction unit 316 calculates accurate position information of the rotor 201 on the basis of magnetic flux vector information output from the magnetic sensor 302 and disturbance magnetic flux information output from the magnetic flux error calculation unit 314.

As a result, the power conversion device 300 realizes stable motor control. Also in the present example, as described in Example 3, in a case where the magnitude of disturbance magnetic flux is within a range of not influencing motor control, the magnitude of a voltage vector or a current without requiring correction may be stored.

With the above-described configuration, it is possible to remove the influence of disturbance magnetic flux of each main circuit wiring even in a situation in which internal information of the motor drive apparatus is not known, and thus it is possible to realize stable motor control with high performance.

Example 5

In the Examples hitherto, a description has been made of a method of correcting a rotor position under a situation in which the magnetic sensor and the magnitude of disturbance magnetic flux in an in-surface direction are known. However, in a magnetic sensor into which an IC is built, the IC may perform calculation of a magnetic flux vector so as to output only position information θ of a sensor magnet. In this case, as described in the Examples hitherto, it is hard to correct the position information θ by using only a disturbance magnetic flux vector. Therefore, in the present example, a description will be made of an operation of the magnetic flux error calculation unit in a case where an output from the magnetic sensor is the position information θ.

FIG. 10 illustrates a case where a disturbance magnetic flux vector is generated in the X direction when a current flows through the main circuit wiring in a state in which a magnetic flux vector of the sensor magnet is generated in the X direction, and FIG. 11 illustrates a case where a disturbance magnetic flux vector is generated in the X direction when a current flows through the main circuit wiring in a state in which a magnetic flux vector of the sensor magnet is generated in the Y direction. In FIG. 10, the magnet magnetic flux vector and the disturbance magnetic flux vector are generated in the same direction, and thus the position information θ output from the magnetic sensor is not influenced by the disturbance magnetic flux vector. On the other hand, in FIG. 11, the direction of the magnet magnetic flux vector and the disturbance magnetic flux vector are different from each other by 90 degrees, and thus the position information θ output from the magnetic sensor is considerably influenced by the disturbance magnetic flux vector. As mentioned above, in the magnetic sensor outputting only the position information θ, the influence of the disturbance magnetic flux vector greatly changes depending on a position of the sensor magnet. Thus, as in the Examples hitherto, it is hard to accurately correct position information of the rotor on the basis of only information regarding a direction and the magnitude of a current flowing through the main circuit wiring.

Next, FIG. 12 illustrates a result that, assuming that a disturbance magnetic flux vector is constant in the X direction, a true value θs of a rotor position in a case where the sensor magnet is rotated by 360 degrees is taken on a transverse axis, and a difference between magnetic sensor outputs θc and θs including the influence of the disturbance magnetic flux vector, that is, a positional deviation amount θd caused by the disturbance magnetic flux is calculated in a trial manner. As is clear from FIG. 12, the influence of the disturbance magnetic flux increases as the magnet magnetic flux vector becomes distant from the X axis, and the influence θd of the disturbance magnetic flux vector appears as a substantial sine wave. Here, in a case of a condition in which a direction of the disturbance magnetic flux vector differs, a peak of a sine wave and a zero-cross phase are deviated depending on the disturbance magnetic flux vector.

<Case 1: in Case where Disturbance Magnetic Flux of Motor Three-Phase Lines Exerts Influence>

In a case where the magnetic flux error calculation unit 314 stores therein a relationship between a magnet position θs at each current phase and the influence θd of a disturbance magnetic flux vector in FIG. 7, it is possible to correct the influence of the disturbance magnetic flux vector on the basis of θd and position information θc output from the magnetic sensor. Hereinafter, a description will be made of a position information correction method.

The position information θc output from the magnetic sensor 203 at any time point is as follows.

$$\theta c = \theta s + \theta d \quad (6)$$

On the other hand, the power conversion device 300 determines a phase of a motor current on the basis of a current detection value at any time point, and derives data regarding the magnet position θs and the influence θd of the disturbance magnetic flux stored in the magnetic flux error calculation unit 314. Since θd linearly changes with respect to the magnitude of a peak current at the same current phase, the influence of the disturbance magnetic flux is linearly corrected on the basis of the magnitude of a current of the main circuit wiring, and the corrected influence is indicated by θd'.

Then, the influence θd' of the disturbance magnetic flux on a magnet position θs' estimated by the magnetic flux error calculation unit 314 is arbitrarily determined, and θs' satisfying a condition shown in Equation (7) is a true value of the sensor magnet.

$$\theta c - \theta d' = \theta s' \quad (7)$$

Here, the magnetic flux error calculation unit 314 may store therein information regarding θd at a certain current value. As illustrated in FIG. 12, since θd is a substantially sine wave, if the magnetic flux error calculation unit 314 stores a peak value and phase information of θd, it is possible to extrapolate θs. As a result, an information amount of θd stored in the magnetic flux error calculation unit 314 can be considerably reduced.

The information regarding θs and θd stored in the magnetic flux error calculation unit 314 may be obtained according to any of the methods described in the Examples hitherto.

<Case 2: in Case where Disturbance Magnetic Flux of DC Bus Exerts Influence>

A current of the DC bus has a single direction, and magnitudes of currents on the positive side and the negative side match each other. Thus, a direction of a disturbance magnetic flux vector is uniquely determined. As a result, the magnetic flux error calculation unit 314 may store therein only a positional deviation amount θd" with respect to the sensor magnet position θs. In other words, only one of the data pieces regarding θs and θd" for the DC bus may be used.

The magnetic flux error calculation unit 314 outputs both of the positional deviation θd' caused by a motor current value and the positional deviation θd" caused by the DC bus by using the motor current value and a DC bus current value supplied from the current detection unit.

As mentioned above, the magnetic flux error calculation unit 314 stores therein the position information based on the disturbance magnetic flux created in any of Cases 1 and 2. Next, the magnetic flux error calculation unit 314 calculates the magnitude of positional deviation caused by disturbance magnetic flux relative to a sensor magnet position by using the magnitude of a current obtained from the current detection unit 311 and a direction of the current obtained from the PWM generation unit 313, and outputs the magnitude of positional deviation. The position correction unit 316 calculates accurate position information of the rotor 201 on the basis of sensor magnet position information output from the magnetic sensor 302 and the information regarding the positional deviation caused by the disturbance magnetic flux relative to the sensor magnet position output from the magnetic flux error calculation unit 314.

As a result, the power conversion device 300 realizes stable motor control. Also in the present example, as described in Example 3, in a case where the magnitude of disturbance magnetic flux is within a range of not influencing motor control, the magnitude of a voltage vector or a current without requiring correction may be stored.

With the above-described configuration, it is possible to remove the influence of a disturbance magnetic flux vector even in a system in which the magnetic sensor outputs only the position information θ.

Example 6

FIG. 13 illustrates a circuit diagram in Example 6. In the present example, a system is considered in which one or more motors are driven with two power conversion devices. The present system realizes a redundant system, and is a system in which, even in a case where one three-phase bridge circuit fails, the other three-phase bridge circuit is continuously operated, and thus a motor is continuously driven.

The motor 200 is a redundant motor in which two three-phase coils are disposed in a single metal casing, a rotor is common to the coils, and a sensor magnet is attached at a distal end of the rotor. The power conversion device 300 includes a three-phase bridge circuit 301 electrically connected to a three-phase coil 201 of the motor 200, and a three-phase bridge circuit 350 electrically connected to a three-phase coil 202. The power conversion device includes current detection units 311 and 351 respectively detecting currents of the three-phase bridge circuit 301 and the three-phase bridge circuit 350. The power conversion device includes current control units 312 and 352 and PWM generation units 313 and 353 for outputting voltage commands to the three-phase bridge circuits 301 and 350, and, in this system, independent control can be performed with respect to a current command value supplied from the motor drive apparatus 10. On the other hand, since the sensor magnet 202 is used in common, the number of each of the magnetic sensor 302, the magnetic flux error calculation unit 314, the initial position correction unit 315, and the position correction unit 316 provided in the power conversion device 300 is one. Two DC power sources 400 are illustrated, but two DC power sources may be provided separately, and a single DC power source may be used in common.

The three-phase bridge circuits 301 and 350, and the controller 310 controlling the three-phase bridge circuits are mounted in a single common casing in order to realize high density mounting. Thus, disturbance magnetic flux vectors Bd are generated from main circuit wirings of the three-phase bridge circuits 301 and 350, and the disturbance magnetic flux vectors influence the magnetic sensor 302 as described hitherto.

Therefore, the magnetic flux error calculation unit 314 extracts a correction amount of a disturbance magnetic flux vector described in the Examples hitherto on the basis of the magnitude and a direction of a current of each three-phase bridge circuit, and outputs the correction amount to the position correction unit 316. As a result, the position correction unit 316 can remove the influence of disturbance magnetic flux from an output from the magnetic sensor 302, and thus the power conversion device 300 realizes stable motor control. By applying the method according to the present example, even in a case where one system fails, the magnetic flux error calculation unit corrects the influence of disturbance magnetic flux on the basis of only the other current detection value, and thus it is possible to continuously realize stable motor driving.

Example 7

FIG. 14 illustrates Example 7. Example 7 is an example in which the present invention is applied to an electric power steering device. As illustrated in FIG. 14, the motor drive apparatus 10 generates torque via a gear 4 attached to a rotation shaft of a steering wheel 1 of a vehicle, so as to assist the steering wheel 1 in steering. Here, the control technique described hitherto is applied to the drive apparatus 10.

As mentioned above, the electric power steering device includes a miniaturized power conversion device, and can thus be applied to a vehicle with a small mounting space, so that various kinds of vehicles can be developed. In the above-described Examples, the description has been made in relation to the three-phase motor and the three-phase bridge circuit, but, the same effect can be achieved in any forms, for example, as long as a power conversion device controls a current or a voltage by detecting a position of a rotor, such as a combination with a DC motor or a power conversion device which converts AC power into DC power.

REFERENCE SIGNS LIST

10: MOTOR DRIVE APPARATUS, 200: MOTOR, 201: ROTOR, 202: SENSOR MAGNET, 210: MAGNETIC FLUX FROM SENSOR MAGNET, 300: POWER CONVERSION DEVICE, 301: THREE-PHASE BRIDGE CIRCUIT, 302: MAGNETIC SENSOR, 303: CONTROLLER, 311 AND 351: CURRENT DETECTION UNIT, 312 AND 352: CURRENT CONTROL UNIT, 313 AND 353: PWM GENERATION UNIT, 314: MAGNET IC FLUX ERROR CALCULATION UNIT, 315: INITIAL POSITION CORRECTION UNIT, 316: POSITION CORRECTION UNIT, 400: DC POWER SOURCE, 501: MAIN CIRCUIT WIRING, 510: MAGNETIC FLUX FROM MAIN CIRCUIT WIRING

The invention claimed is:

1. A motor drive apparatus controlling an operation of a power conversion device outputting a current to a motor on the basis of a desired torque command value, the apparatus comprising:
    a main circuit wiring that is electrically connected to a switching element forming the power conversion device, and through which a DC current or an AC current is transmitted thereto;
    a magnetic sensor that detects a magnetic flux change of a sensor magnet attached to a rotor of the motor; and
    a controller that calculates a current command value which is output from the power conversion device to the motor on the basis of position information of the rotor detected by the magnetic sensor,
    wherein the controller includes a magnetic flux error correction unit that detects or calculates a magnetic flux component generated by a current flowing through the main circuit wiring and a position correction unit that removes the magnetic flux component generated by the current flowing through the main circuit wiring from an output of the magnetic sensor.

2. The motor drive apparatus according to claim 1, wherein the magnetic flux error correction unit calculates a magnetic flux component generated by a current flowing through the main circuit wiring on the basis of the magnitude and a direction of the current flowing through the main circuit wiring.

3. The motor drive apparatus according to claim 1, wherein the magnetic flux error correction unit stores therein position information of the main circuit wiring and the magnetic sensor, and calculates a magnetic flux component generated by a current flowing through the main circuit wiring on the basis of the magnitude and a direction of the current flowing through the main circuit wiring, and the position information.

4. The motor drive apparatus according to claim 1, wherein the magnetic sensor outputs the magnitude in an in-surface direction of a magnetic flux vector supplied from the sensor magnet.

5. The motor drive apparatus according to claim 1, wherein the magnetic sensor outputs angle information for a magnetic flux vector supplied from the sensor magnet, and
    wherein the magnetic flux error correction unit calculates a magnetic flux component generated by a current flowing through the main circuit wiring on the basis of the magnitude and a direction of a current flowing through the main circuit wiring, and the angle information of the magnetic sensor.

6. The motor drive apparatus according to claim 1, wherein the controller corrects a detection value in the magnetic sensor on the basis of a detection value or a calculation value in the magnetic flux error correction unit.

7. The motor drive apparatus according to claim 1, wherein correction of a detection value in the magnetic sensor is performed in a case where a current value of the motor is equal to or greater than a predetermined value.

8. The motor drive apparatus according to claim 1, wherein correction of a detection value in the magnetic sensor is performed only in a case where a voltage vector command value of the power conversion device satisfies a predetermined condition.

9. A motor drive apparatus controlling an operation of a power conversion device outputting a current to an AC motor on the basis of a desired torque command value, the power conversion device including two or more three-phase bridge circuits, the apparatus comprising:
    a main circuit wiring that is electrically connected to a switching element forming each of the three-phase bridge circuits, and through which a DC current or an AC current is transmitted thereto;
    a magnetic sensor that detects a magnetic flux change of a sensor magnet attached to a rotor of the AC motor; and
    a controller that calculates a current command value which is output from the power conversion device to the motor on the basis of position information of the rotor detected by the magnetic sensor,
    wherein the controller includes a magnetic flux error correction unit that separately detects or calculates magnetic flux components generated by a current flowing through a main circuit wiring connected to one of the three-phase bridge circuits and a current flowing through a main circuit wiring connected to the other three-phase bridge circuit and a position correction unit that removes the magnetic flux components generated by the current flowing through the main circuit wiring from an output of the magnetic sensor.

10. The motor drive apparatus according to claim 9, wherein the magnetic flux error correction unit stores therein position information of the main circuit wiring and the magnetic sensor, and calculates a magnetic flux component generated by a current flowing through the main circuit wiring on the basis of the magnitude and a direction of the current flowing through the main circuit wiring, and the position information, in a case where both of the three-phase bridge circuits or only one of the three-phase bridge circuit is being operated.

11. An electric power steering device comprising the power conversion device according to claim 1.

12. An electric power steering device comprising the power conversion device according to claim 9.

* * * * *